Patented Sept. 5, 1950

2,521,579

UNITED STATES PATENT OFFICE 2,521,579

PREPARATION OF MEAT PRODUCTS

Ervin W. Hopkins, Hinsdale, and Lucian J. Jendryaszek and Harold M. Coleman, Chicago, Ill., assignors to Armour and Company, Chicago, Ill., a corporation of Illinois No Drawing. Application December 3, 1945, Serial No. 632,612

3 Claims. (Cl. 99—194)

This invention relates to processes for the preparation of meat products having improved color characteristics. It deals particularly with processes for treating the meat pigments to provide a bright red color.

A serious disadvantage in the marketing of many meats, particularly ground meats such as hamburger, is the purplish-red color on the interior of the meat mass which is less acceptable to the consumer than meat which possess a bright red color throughout. When first ground, hamburger is bright red in color, but when put in a package and carried home by the consumer it will be found when broken apart to have the characteristic purplish color on its interior. Frequently there appears a purple-brown ring of color just beneath the exterior surface. Although such color variations are in fact in no way indicative of spoilage or the nutritional value of the meat, they are disquieting to the consumer, and the meat packing industry has long sought to overcome them.

Meat contains a number of oxygen-bearing pigments including myoglobin and hemoglobin which are compounds of ferroheme and protein. Myoglobin is purplish-red in color and when it takes up oxygen it becomes oxymyoglobin which is bright red. The term "oxygen-bearing pigments" as used herein is meant to include the compounds of ferroheme and protein which are capable of taking up or releasing oxygen, and is intended to include such compounds whether they be in their oxygenated or deoxygenated forms.

We have discovered that the objectionable purple-red color within a meat mass, such as ground hamburger, is due to the action of reducing systems present in the meat, and which can operate beneath the exposed surface to reduce the pigments from their oxygenated form. For example, oxymyoglobin is reduced to myoglobin and oxyhemoglobin is reduced to hemoglobin. We have further found that by introducing oxygen into the meat mass, such reduction of meat pigments can be avoided and the bright red color maintained. It is desirable that the introduced oxygen be well distributed throughout the meat mass so that all portions will be equally affected so that a uniform color will be obtained. Pure oxygen may be introduced into the meat, but since oxygen is contained in air we find it more convenient to introduce the oxygen in the form of air.

We have devised special procedures wherein oxygen is introduced into a meat mass and the advantage of a bright red interior color is obtained. These procedures will now be described.

A preferred practice involves first grinding the meat, freezing the ground meat, breaking the frozen mass into many small pieces, and then pressing the pieces together with pressure sufficient to bind them but not strong enough to close the inner interstices. For example, beef may be ground in the regular way at room temperature and the ground meat passed into a cold zone where it is frozen solid. Then, with a hammer mill, the frozen mass is broken up into small pieces such as would pass through a plate having one-half inch holes. These particles or small pieces are then put into a press or mold, which may suitably be the size desired for a hamburger patty, and pressure is applied. The pressure should be sufficient to unite the particles but should not be great enough to drive out all the air spaces between the particles. If the pressure is too great, substantially all of the air will be driven from the meat and most of the advantage of the process will be avoided. The pressure which is employed will vary in accordance with the temperature and to a certain degree with the kind of meat. For example, if the meat has a temperature of 0° F. more pressure is employed and more pressure can be tolerated than when the meat is at a temperature of 20° F. In the case of hamburger at 20° F., we find that pressures above 6,000 pounds per square inch give less color advantage, and at pressures of 10,000 pounds per square inch or more the color advantage is greatly diminished. Pressures of the order of 1,000 pounds per square inch or less are usually satisfactory and it is not necessary to use more pressure than is required to unite the pieces. The meat when pressed may be at any temperature at which it it solidly frozen. Temperatures from 30° F. downward have been found satisfactory, but we prefer to operate at temperatures from 20–25° F.

The frozen meat may be broken up in pieces of any desired size, but if the pieces are large and compact, the full color benefit may not be obtained because of incomplete oxygenation of the meat pigments within. For this reason it is desirable that the pieces be not larger than those which will pass through a sieve with ¾-inch openings.

While it is desirable to grind the meat before freezing, this is not essential if the frozen meat is mechanically broken up into small pieces. Due to the hardness of frozen meat, the breaking up operation is less difficult if the meat is ground before freezing. The grinding or breaking up operations may be substituted by any means of comminuting the meat material, as by cutting, dicing, cubing, or other means of comminuting the meat.

It is also possible to omit the step of breaking up the frozen meat material prior to pressing. When this is done we prefer spreading the ground meat in loosely associated condition in a thin layer and freezing the meat in this condition. This may be arranged by discharging the meat from the grinder on a conveyor belt which passes through a low temperature zone to freeze the meat. From the conveyor the frozen meat is discharged into a forming machine adapted to deliver suitable pressures for uniting the meat into patties, loaves, or other desired shapes ready for packaging.

Even in the operation where a machine is employed for breaking up the frozen meat, it is preferable to discharge the meat from the grinder or other comminutor on a conveyor which carries it in dispersed or non-compacted form into the freezing zone, since this accelerates freezing and makes the operation continuous.

Incorporation of oxygen cannot be accomplished by mere mechanical mixing of ground meat however violent the mixing may be, since this leaves no interstices for retaining any oxygen gas and the mixing step tends to drive the oxygen out of the mass.

Another process wherein oxygen is introduced into the meat involves the addition of hollow or porous edible particles. Such materials must have the ability to retain oxygen or air and make the oxygen available at the surface of the particles. For example, spray dried whole milk, skim milk, whey, egg white, or other protein materials, which are in the form of fine globules hollow on their interior, may be mixed into the meat and the oxygen then penetrates the walls of the globules, and then comes into contact with and exerts its color effect on the meat interior. With such fine particles dispersed throughout the meat mass, oxygen is made available for counteracting the effect of reducing systems and a bright red color is maintained. Spongy material such as starch in fine spongy form or dried protein foams may be used. Such materials may be cut or ground into fine pieces of powder and mixed into the meat. Similarly, carriers of air bubbles such as whipped gelatin or fats may be mixed mechanically with ground meat.

Unless the meat is treated to introduce oxygen as by mixing in the oxygen-containing materials such as spongy or globular particles, or by pressing frozen meat particles together, leaving oxygen-containing interstices, the meat when ground and left in a pile assumes a compact form by reason of the weight of its upper portion, and reduction of the oxygen-bearing pigments sets in, resulting in the characteristic disagreeable color on the interior.

With the oxygen made available throughout the meat mass, through procedures such as those just described, a product results which retains a brighter red color throughout than meat prepared by procedures hitherto employed.

Following are specific examples of the practice of our invention:

*Example 1*

Fresh beef trimmings were ground through a worm and plate grinder provided with a plate having $\frac{1}{8}$ inch perforations. The ground meat was spread thinly on trays, frozen at $-50°$ F. and then compressed in a mold at 2000 lbs. pressure. The product prepared in this manner showed improvement in color but had the appearance of poor mixing of fat and lean, and for some purposes this is less desirable. Moreover, the irregular size of the pieces of ground frozen meat does not effect good distribution of small air pockets throughout the frozen compacted mass, and as a consequence, after defrosting local areas of reduced pigment are observed.

*Example 2*

Fresh beef trimmings after grinding through a plate with $\frac{1}{8}$ inch holes were spread on trays, frozen at $-50°$ F. and passed through a hammer mill provided with a sieve having $\frac{1}{2}$ inch perforations. The meat was stored at $20°$ F., for several hours, and then compressed at that temperature. A pressure of 1000 lbs. was found to be sufficient to form patties. The hammer mill treatment results in reduction of particle size and mixing of fat and lean, which produces a uniform desirable appearance. Even after defrosting the meat pigments remained in the oxygenated state for 1 or 2 days.

*Example 3*

Lean beef trimmings were ground through a plate with $\frac{1}{8}$ inch holes, and whipped, solidified oleo oil containing 12 to 14 per cent air by volume was added in the proportion of 1 part to 2 parts of meat. The whipped oleo oil was mixed mechanically with the meat, and the mixture passed through the $\frac{1}{8}$ inch plate. Loaves of this material were bright red on the inside and outside after freezing and defrosting. Whipped gelatine or any liquid or semi-liquid substance into which air can be incorporated may be used in the same manner.

*Example 4*

Beef which has been coarsely ground was mixed in proportions of 3 parts of meat and 1 part of chipped ice and ground through a plate with $\frac{1}{16}$ inch holes. The desired redness inside and outside of a loaf formed from the meat was observed after freezing and defrosting. Instead of the chipped ice we can use other solids such as $CO_2$ or hard frozen beef fat, which have the characteristic of fracturing in the grinding operation.

The foregoing examples are given for purposes of illustration only and are not intended in any limited sense, it being understood that oxygen may be introduced to a meat body in many and varying procedures, all within the spirit of the invention.

The total amount of oxygen introduced by the procedures we have described is extremely small, and it is not to be expected that such an amount would have any substantial effect in altering the pigments of the meat interior. However, we find, contrary to our original expectations, that the oxidizing of the pigments is in fact promoted by the presence of a slight amount of oxygen to a greater extent than it is by the presence of an abundance of oxygen, and we believe this explains to some extent the striking color improvement which we obtain when, for example, we press together frozen meat particles while retaining minute interstices containing oxygen.

We claim:

1. In a process for preparing a meat product having improved interior color, the steps of comminuting meat while in unfrozen condition until the particles are about $\frac{1}{8}$ inch in cross section, freezing the comminuted meat to a solid state while the meat is in loosely associated condition, and then pressing the meat while thus solidly frozen and at a temperature of about 0°–20° F. with just enough pressure to bind the meat particles together.

2. In a process for preparing a meat product having improved interior color, the steps of comminuting meat while in unfrozen condition until the particles of the same do not exceed a diameter of about ⅛ inch, forming the comminuted meat in thin layers, freezing the thin layers of meat to a solid state while the meat is in loosely associated condition, and then pressing the meat while thus solidly frozen and at a temperature of about 0°–20° F. with just enough pressure to bind the same together.

3. In a process for preparing a meat product having improved interior color, the steps of comminuting meat while in unfrozen condition to a particle size of about ⅛ inch in diameter, freezing the comminuted meat in thin layers while the meat is in loosely associated condition, and then pressing the meat while thus solidly frozen and at a temperature of about 0°–20° F. in small patty form with just enough pressure to bind the particles together in said patties.

ERVIN W. HOPKINS.
LUCIAN J. JENDRYASZEK.
HAROLD M. COLEMAN.

REFERENCES CITED

The following references are of record in the file of this patent:

UNITED STATES PATENTS

| Number | Name | Date |
|---|---|---|
| 1,909,508 | Schick | May 16, 1933 |
| 1,943,019 | Henney et al. | Jan. 9, 1934 |
| 2,060,422 | McKee et al. | Nov. 10, 1936 |
| 2,355,548 | Musher | Aug. 8, 1944 |